Jan. 24, 1961 H. K. ROBIN 2,969,431

SIMULTANEOUS-TO-SEQUENTIAL CODE CONVERTER

Original Filed Dec. 11, 1950 3 Sheets-Sheet 1

INVENTOR
Harold K. Robin
BY
Ralph B. Stewart
ATTORNEY

SIMULTANEOUS-TO-SEQUENTIAL CODE CONVERTER

Original Filed Dec. 11, 1950

3 Sheets-Sheet 2

INVENTOR
Harold K. Robin
BY
Ralph B. Stewart
ATTORNEY

SIMULTANEOUS-TO-SEQUENTIAL CODE CONVERTER

Original Filed Dec. 11, 1950

3 Sheets-Sheet 3

INVENTOR
Harold K. Robin
BY
Ralph B. Stewart
ATTORNEY 2,969,431

SIMULTANEOUS-TO-SEQUENTIAL CODE CONVERTER

Harold Kilner Robin, Tunbridge Wells, England, assignor, by mesne assignments, to National Research Development Corporation, London, England, a corporation of Great Britain and Northern Ireland Continuation of application Ser. No. 649,131, Mar. 28, 1957, which is a division of application Ser. No. 200,150, Dec. 11, 1950, now Patent No. 2,816,163, dated Dec. 10, 1957. This application Nov. 3, 1959, Ser. No. 850,734

Claims priority, application Great Britain Dec. 14, 1949

6 Claims. (Cl. 178—53.1)

The present invention relates to electric pulse signalling systems, and is concerned with the conversion of codes in the form of groups each composed of pulses which appear simultaneously at a plurality of input terminals respectively, to corresponding codes in the form of successions of pulses. The two forms will be hereinafter referred to as simultaneous codes and successive codes respectively, and each consists of combinations of pulses of predetermined maximum number. For example, if the maximum number of pulses is five, thirty-two codes can be provided by the thirty-two possible combinations of pulses (including zero and all five).

The need for such a conversion arises, for example, in a communication system as described in the co-pending patent application Serial No. 200,150, filed December 11, 1950 (now Patent No. 2.816,163) from which the present application is divided, wherein a signal for application to a teleprinter is made available, as a code in the form of pulses occurring simultaneously at input terminals respectively. It is necessary to convert this simultaneous code into a corresponding successive code before applying the signal to the teleprinter.

When a sequence or number of simultaneous codes is used to transmit intelligence in a multi-channel, time-sharing, communication system, for example, as described in the aforesaid co-pending patent application, it is also required to distribute the converted codes to a number of output terminals respectively, each passing signals of a different channel.

It is an object of the present invention to provide apparatus for converting a sequence of simultaneous codes to a sequence of corresponding successive codes, and distributing the last said codes to a number of output terminals respectively.

According to the present invention apparatus is provided for converting a plurality of simultaneous codes appearing in sequence at a common set of input terminals to a sequence of corresponding successive codes and distributing the last said sequence to a plurality of output terminals respectively, different codes being distributed to different output terminals, the apparatus comprising a number of sets of storage relay devices equal to the number of simultaneous codes in the sequence, the number of relay devices in each of the several sets being equal to the maximum number of pulses in the several codes respectively, the several relay devices in each set being associated with the common input terminals respectively at which the pulses in the simultaneous codes appear, and each storage relay device being adapted to become operated only when a pulse from a simultaneous code and a triggering pulse are applied to the relay device simultaneously, apparatus for applying the sequence of simultaneous codes and the triggering pulse or pulses to the sets of relay devices in such a manner that the several sets receive in turn a simultaneous code and a triggering pulse or pulses simultaneously, the triggering pulse or pulses applied to each set being simultaneously applied to all the relay devices of the set, and apparatus for exploring in turn the relay devices of each set in such a manner that an output pulse is transmitted to an output terminal of the set when an operated relay device is explored and no output pulse is transmitted to the output terminal when an unoperated relay device is explored.

The storage relay devices may be, for example, in the form of gas-filled discharge tubes of the thyratron type which, upon being rendered conductive, remain conductive until interruption of the anode current. On the other hand the relay devices may be in the form of relays having "hold-on" coils, or in the form commonly known as "flip-flop" circuits. The simultaneous application of a triggering pulse or pulses and a simultaneous code to the sets of relay devices in turn, may be effected by applying each simultaneous code to all the sets and applying a triggering pulse or pulses to the several sets in turn. On the other hand the triggering pulse or pulses may be applied to all sets simultaneously and the simultaneous codes may be applied to the several sets respectively. The exploration of the relay devices may be effected by applying a pulse to the relay devices in turn from a suitable distributor such as a mechanical distributor or a delay network. On the other hand a voltage may be applied to all the relay devices in the set and the several relay devices may be connected to an output terminal in turn.

One embodiment of the invention will now be described with reference to the accompanying drawings in which.

The arrangement to be described is for use in a fifteen-channel, time-sharing, pulse communication system as described in the aforesaid co-pending patent application, and effects the conversion of simultaneous codes in the fifteen channels respectively to successive codes and distributes the successive codes to fifteen output terminals. The system is used for teleprinter communication, and hence, as a standard teleprinter signal consists of a "start" and "stop" signal in addition to a successive code, the "start" and "stop" signals are added to each successive code applied to the output terminals.

Figure 1:
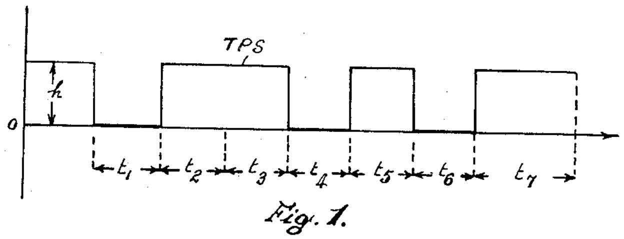
Fig. 1 is a diagram of a standard teleprinter signal.

In standard teleprinter practice each transmitted character is represented by a series of signals the series being of 166 milliseconds duration. Each series consists of a "start" signal lasting about 22 milliseconds during which no current is passed into the receiving teleprinter. This signal is followed by five further signals each lasting about 22 milliseconds during which a current of fixed magnitude, or zero current, is passed into the teleprinter dependent upon the character being transmitted. These five signals are followed by a "stop" signal lasting about 33 milliseconds during which current of fixed magnitude is passed into the teleprinter. An example of such a series is shown in Fig. 1 by a curve TPS. In Fig. 1 the ordinate represents magnitude, the abscissa represents time, the intervals $t_1$ to $t_6$ are each of about 22 milliseconds, and the interval $t_7$ is of 33 milliseconds. The signal commences at the beginning of the interval $t_1$ and ends at the end of the interval $t_7$. It will be seen that during the interval $t_1$ (start signal) and intervals $t_4$ and $t_6$ zero current is flowing, and that during the intervals $t_2$, $t_3$, $t_5$ and $t_7$ (stop signal), a current of amplitude $h$ is flowing. The signals $t_2$ to $t_6$ carry the information which determines the character to be printed by the receiving teleprinter. Those of signal $t_2$ to $t_6$ of zero amplitude are usually termed "space" signals and those of amplitude $h$ are usually termed "mark" signals. Including the combination having five space signals and that including five mark signals there are 32 possible combinations of mark and space signals.

Figure 2:
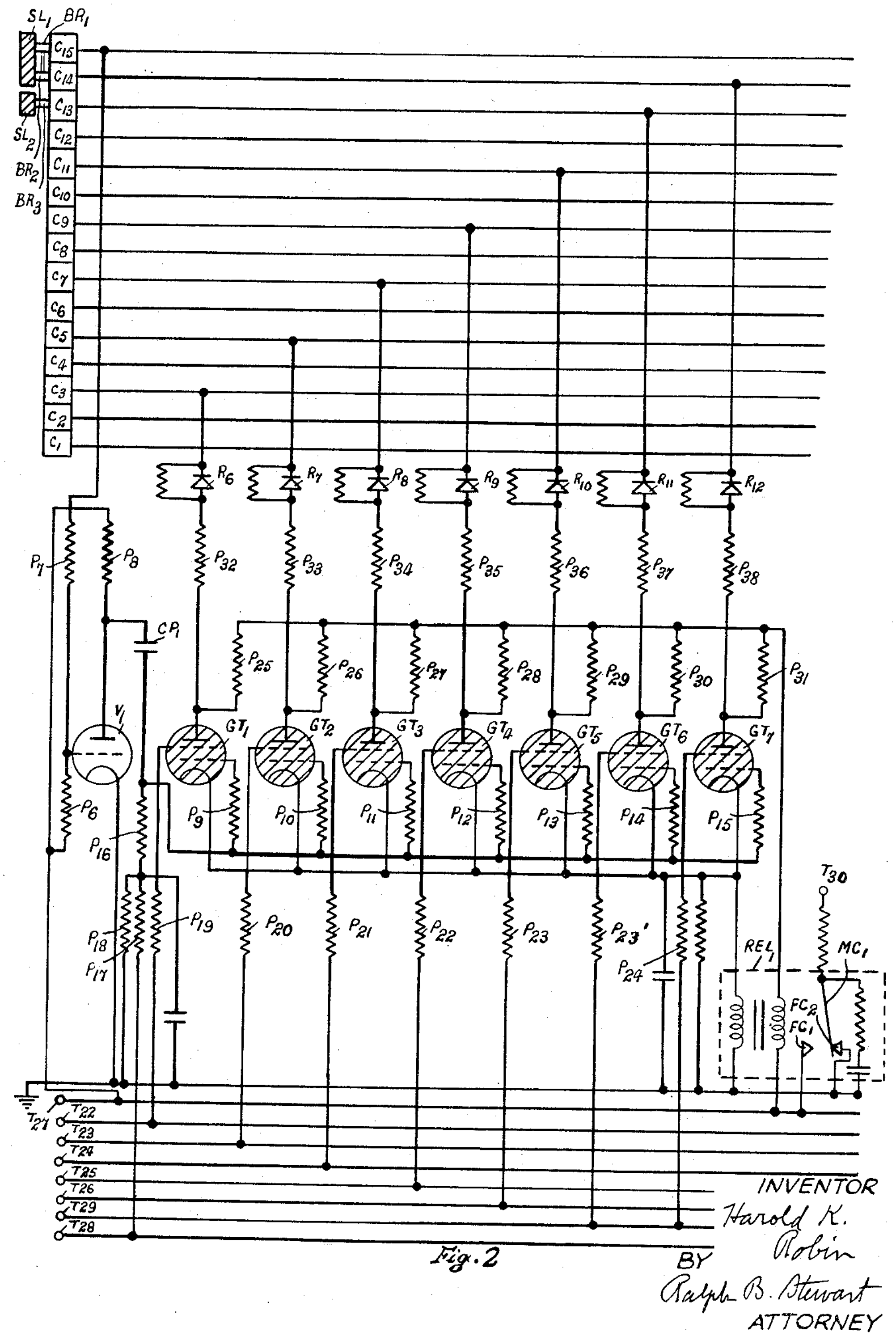
Figs. 2 and 3 are schematic diagrams showing two sets respectively of relay devices in the form of gas-filled discharge tubes.
Figure 3:
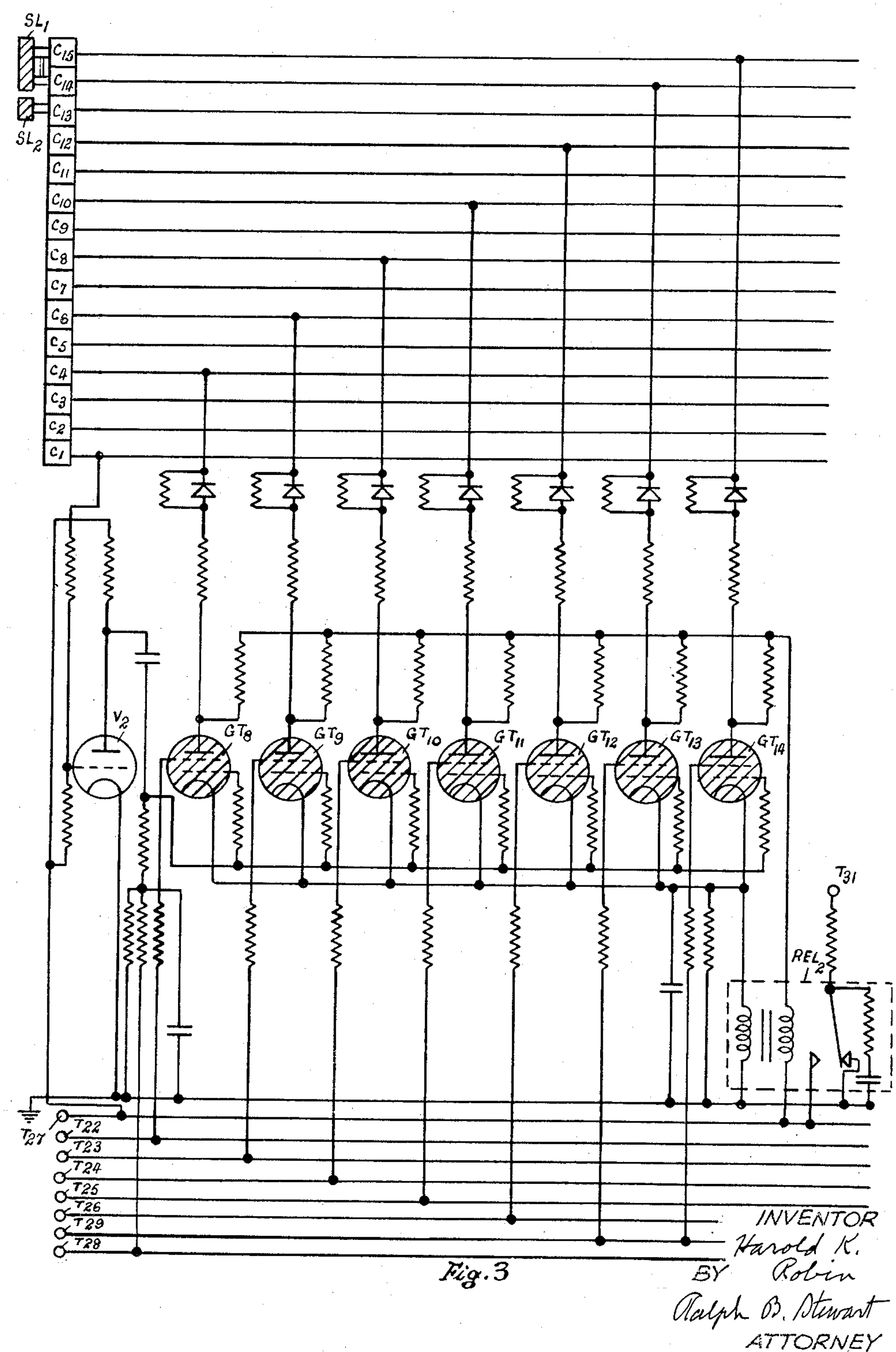

Referring to Fig. 2, this shows apparatus for use in channel No. 1 of the fifteen-channel system simultaneous codes in all fifteen channels in succession appear at five input terminals $T_{22}$ to $T_{26}$, each code lasts for about one millisecond and the codes appear at the rate of one every 11.11 milliseconds. Altogether fifteen sets of apparatus as shown in Fig. 2 are provided (one for each channel) and the set for channel No. 2 is shown in Fig. 3.

Figure 4:
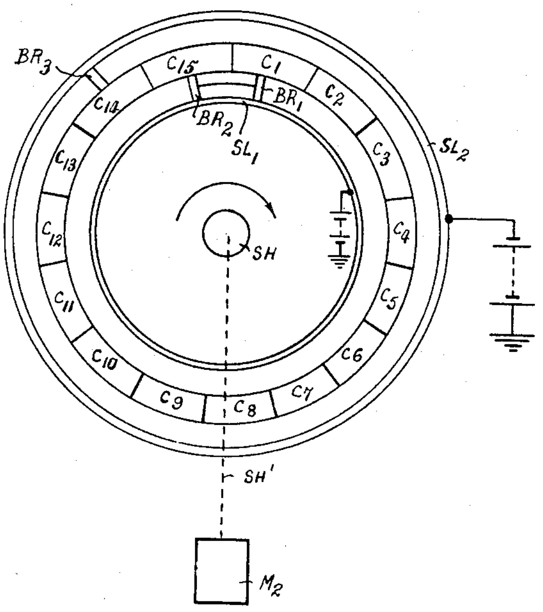
Fig. 4 is a schematic diagram of a distributor.

Referring to Fig. 4 this shows a distributor comprising a ring of conducting segments or contacts $C_1$ to $C_{15}$ which are insulated from one another. A slip ring $SL_1$ is disposed on one side of the segments $C_1$ to $C_{15}$ and a second slip ring $SL_2$ is disposed on the opposite side. The two slip rings $SL_1$ and $SL_2$ are arranged (in any suitable manner such as by batteries as shown) to have potentials of +100 volts and −100 volts respectively relatively to earth. Two brushes $BR_1$ and $BR_2$ are arranged to make connections between the slip ring $SL_1$ and the contacts $C_1$ to $C_{15}$ in turn as the brushes are rotated. A third brush $BR_3$ is arranged to make a connection between the slip ring $SL_2$ and the contacts $C_1$ to $C_{15}$ as this brush is rotated. The three brushes $BR_1$, $BR_2$ and $BR_3$ are arranged to be rotated in step by a shaft SH in the direction of the arrow whereby the brush $BR_3$ lags on the brushes $BR_1$ and $BR_2$. The brushes $BR_1$ and $BR_2$ are arranged to be in contact with two adjacent contacts at any instant, these brushes being shown in contact with contacts $C_1$ and $C_{15}$ respectively in Fig. 4 of the drawing. At the same instant the brush $BR_3$ is made to be in contact with the contact next preceding that in engagement with the brush $BR_2$. In Fig. 4 of the drawing the brush $BR_3$ is shown to be in contact with the contact $C_{14}$.

The shaft SH is coupled to a 60 c./s. synchronous motor $M_2$ by any suitable gearing of 5:1 ratio shown in the drawing by a broken line $SH^1$. The shaft of the motor $M_2$ is arranged to rotate at 1,800 r.p.m. whereby the brushes $BR_1$, $BR_2$ and $BR_3$ make six complete revolutions every second, that is to say, approximately one every 166 milliseconds. In this way each of the brushes remain in contact with each of the contacts $C_1$ to $C_{15}$ in turn for a period of 11.11 milliseconds.

For the purpose of further description it is preferred to represent the contacts $C_1$ to $C_{15}$ of Fig. 4 in extended fashion as shown in Fig. 2.

Fig. 2 shows apparatus for supplying suitable voltages to a teleprinter in No. 1 channel as already described. Seven thyratrons $GT_1$ to $GT_7$ are provided. These are of the type having two control grids as shown. In order to strike thyratrons of this type it is necessary to apply positive potential to the anode and both grids. A triode $V_1$ is also provided for triggering the thyratrons $GT_1$ to $GT_7$. The cathode of the valve $V_1$ is connected to earth, the control grid through a resistor $P_6$ to a terminal $T_{27}$ and through a resistor $P_7$ to contact $C_{15}$ of the distributor. The terminal $T_{27}$ is arranged to have a potential of +100 volts and the anode of the valve $V_1$ is connected to this terminal through a resistor $P_8$. The inner grids of the thyratrons $GT_1$ to $GT_7$ are connected through resistors $P_9$ to $P_{15}$ respectively and the common terminal of all these resistors is connected through a resistor $P_{16}$ to the junction of two resistors $P_{17}$ and $P_{18}$ connected between a terminal $T_{28}$ and earth. The terminal $T_{28}$ is arranged to have a potential of −75 volts whereby the inner grids of the thyratrons $GT_1$ to $GT_7$ are normally negatively biased. The anode of the valve $V_1$ is coupled through a capacitor $CP_1$ to the common terminal of the resistors $P_9$ to $P_{15}$.

The outer grids of the thyratrons $GT_1$ to $GT_5$ are connected through resistors $P_{19}$ to $P_{23}$ to the five terminals $T_{22}$ to $T_{26}$. The outer grids of the thyratrons $GT_6$ and $GT_7$ are connected through resistors $P_{23}{}^1$ and $P_{24}$ respectively to a terminal $T_{29}$ which is arranged to have a positive potential whereby the outer grids of the two thyratrons $GT_6$ and $GT_7$ are normally positive. The cathodes of the thyratrons are connected together and through one winding of a differential relay $REL_1$ to earth. The anodes of the seven thyratrons $GT_1$ to $GT_7$ are connected through resistors $P_{25}$ to $P_{31}$ respectively and through the other winding of the differential relay $REL_1$ to the terminals $T_{27}$. The anodes of the thyratrons $GT_1$ to $GT_7$ are also connected through resistors $P_{32}$ to $P_{38}$ and rectifiers $R_6$ to $R_{12}$ respectively to contacts $C_3$, $C_5$, $C_7$, $C_9$, $C_{11}$, $C_{13}$ and $C_{14}$ respectively of the distributor. The relay $REL_1$ has a fixed contact $FC_1$ connected to the terminal $T_{27}$ at +100 volts, and a second fixed contact $FC_2$ connected to earth. The moving contact $MC_1$ of the relay $REL_1$ is connected to an output terminal $T_{30}$ for connection to a teleprinter input terminal.

In operation, as the brush $BR_3$ passes over the contact $C_{15}$ the brushes $BR_1$ and $BR_2$ pass over contacts $C_2$ and $C_1$ respectively. During this interval of 11.11 milliseconds a negative-going pulse of 100 volts is applied from the contact $C_{15}$ to the control grid of the triode $V_1$ causing the anode current of this valve to be cut off and a large positive-going pulse to be applied to the inner grids of the seven thyratrons $GT_1$ to $GT_7$. The thyratrons $GT_6$ and $GT_7$ have positive potential on their outer grids from the terminal $T_{29}$, and positive potential on their anodes through the resistors $P_{30}$ and $P_{31}$ respectively. These two thyratrons strike. The anodes of the thyratrons $GT_1$ to $GT_5$ have positive potential applied thereto through the resistors $P_{25}$ to $P_{29}$ respectively. Those of the thyratrons $GT_1$ to $GT_5$ whose outer grids are connected to those of terminals $T_{22}$ to $T_{26}$ which are at positive potential, strike and the remainder stay non-conducting. When the valves strike the currents through the two windings of relay $REL_1$ are equal. Only when positive voltage is applied via $BR_1$ and $BR_2$ to a valve already struck is the cathode current increased to operate relay $REL_1$ to mark. Throughout the interval of 11.11 m.s. during which brushes $BR_1$ and $BR_2$ are in contact with contacts $C_1$ and $C_2$, the current flowing in the two windings of the relay $REL_1$ remain equal and the moving contact $MC_1$ remain in contact with the earthed fixed contact $FC_2$ and hence a space signal is sent to the terminal $T_{30}$. The brushes move on and during the next five successive intervals of about 22 milliseconds duration each, the contacts $C_3$, $C_5$, $C_7$, $C_9$ and $C_{11}$ are made 100 volts positive in turn by the brushes $BR_1$ and $BR_2$. These five contacts are connected through the rectifiers $R_6$ to $R_{10}$ respectively to the anodes of the five thyratrons $GT_1$ to $GT_5$. A positive-going pulse of 22 milliseconds duration is, therefore, applied to these anodes in turn. The cathode current of each of the thyratrons $GT_1$ to $GT_5$ which is struck is increased whereby the relay $REL_1$ is operated causing a mark signal to be transmitted to the terminal $T_{30}$. The cathode current of each of the thyratrons $GT_1$ to $GT_5$ which is non-conducting remains unaltered whilst the positive pulse is applied to the anode thereof, and hence a space signal is sent to the terminal $T_{30}$. In this way five mark and/or space signals each of about 22 milliseconds duration follow each other in succession in dependence upon the potentials applied to the terminals $T_{22}$ to $T_{26}$ during the interval when the brush $BR_3$ was on the contact $C_{15}$.

The brushes move on and $BR_1$ and $BR_2$ in passing over contacts $C_{13}$ and $C_{14}$ in succession cause a positive-going pulse of about 22 milliseconds duration to be applied to the anode of the thyratron $GT_6$ and a positive-going pulse of about 11 milliseconds duration to be applied to the anode of the thyratron $GT_7$. The relay $REL_1$ is operated, therefore, for a period of about 33 milliseconds and hence a stop signal of that duration is applied to the terminal $T_{30}$.

Each of the positive-going pulses applied to the anodes of the thyratrons $GT_1$ to $GT_5$ is followed by a negative-going, resetting pulse from the brush $BR_3$ which extinguishes those of the thyratrons $GT_1$ to $GT_5$ which were struck. The brush $BR_3$ on reaching the contact $C_{13}$ causes the thyratron $GT_6$ to be extinguished and on reaching contact $C_{14}$ causes the thyratron $GT_7$ to be extinguished, and the cycle of operations is completed. During the final 11.11 milliseconds interval of the cycle no current flows in the relay $REL_1$ and hence a space signal is applied to the terminal $T_{30}$. This space signal in combination with the space signal occurring during the first interval of 11.11 milliseconds of the cycle of operations described constitute a teleprinter start signal.

It will be seen, therefore, that over each interval of 166 milliseconds (one complete revolution of the brushes) there is transmitted to the terminal $T_{30}$ a start signal of 22 milliseconds duration followed by a combination of five mark and/or space signals in succession each of about 22 milliseconds duration, followed by a stop signal of about 33 milliseconds duration. It is arranged that the combination of mark and/or space signals represents a character to be printed by the channel No. 1 teleprinter. The cycle of operations is repeated at the rate of six cycles per second whereby the teleprinter in channel No. 1 prints the characters as received in channel No. 1 at the standard rate of six every second.

The apparatus for channels Nos. 2 to 15 is the same as that shown in Fig. 2 with the exception that the connections are such that each cycle of operations in the successive channels commences 11.11 milliseconds after that in the preceding channel. For example, the cycle of operations in the apparatus for channel No. 2 commences 11.11 milliseconds after that described with reference to Fig. 2. This is achieved by making the connections between the valves V and the thyratron GT and the contacts $C_1$ to $C_{15}$ in a suitable manner. For example, referring to Fig. 3 this shows the apparatus for channel No. 2. The function of the valves $V_2$ is the same as that of the valve $V_1$ in Fig. 2. Similarly the functions of the thyratrons $GT_8$ to $GT_{14}$ are the same as those of the thyratrons $GT_1$ to $GT_7$ in Fig. 2. In the arrangement of Fig. 3 it will be seen that the anodes of the thyratrons $GT_8$ to $GT_{14}$ are connected to contacts $C_4$, $C_6$, $C_8$, $C_{12}$, $C_{14}$ and $C_{15}$ instead of to contacts $C_3$, $C_5$, $C_7$, $C_9$, $C_{11}$, $C_{13}$, and $C_{14}$ as in the case in Fig. 2. The control grid of the valve $V_2$ is connected to contact $C_1$ instead of to contact $C_{15}$ as is the case in Fig. 2. In this way each cycle of operation of the arrangement shown in Fig. 3 is made to commence 11.11 milliseconds after that of the arrangement of Fig. 2.

I claim:

1. Apparatus for converting a plurality of simultaneous codes appearing in time division sequence at a common set of input terminals to a sequence of corresponding successive codes and distributing the last said sequence to a corresponding plurality of output terminals respectively, different codes being distributed to different output terminals, the apparatus comprising a number of sets of storage relay devices equal to the number of simultaneous codes in the sequence, the number of relay devices in each of the several sets being equal to the maximum number of pulses in the several codes respectively, the several relay devices in each set being associated with the common input terminals respectively at which the pulses in the simultaneous codes appear, and each relay device being of the type to become operated only when a pulse from a simultaneous code and a triggering pulse are applied to the relay device simultaneously, distributor means operating in cycles for applying the sequence of simultaneous codes and the triggering pulse or pulses to the sets of relay devices in such a manner that the several sets receive in turn a simultaneous code and a triggering pulse or pulses simultaneously, the triggering pulse or pulses applied to each set being simultaneously applied to all the relay devices of the set, and means operating synchronously with said distributor means for exploring in turn the relay devices of each set and transmitting an output pulse to the output terminal of the set when an operated relay device is explored.

2. Apparatus according to claim 1, wherein each relay device comprises a gas-filled electron discharge valve having at least two control electrodes, the said input terminals being connected to one of the control electrodes in the several valves respectively in each set, and wherein said distributor means applies the triggering pulse or pulses to the other control electrodes of the valves in each set.

3. Apparatus according to claim 1, wherein the exploring apparatus comprises a distributor operating to apply an exploring pulse to the relay devices in turn in each set.

4. Apparatus according to claim 3, wherein the exploring distributor also operates to apply a resetting pulse to the relay devices in turn in each set.

5. Apparatus according to claim 1 for use when the codes are for application to teleprinters, wherein each set of relay devices comprises additional relay devices for the purpose of adding a "start" signal and a "stop" signal to each successive code, the additional relay devices being controlled by said distributor means to become operative simultaneously with the other relay devices in the set, and to provide the "start" and "stop" signals when explored by the exploring apparatus.

6. Apparatus for converting simultaneous code combinations appearing simultaneously at a common set of input terminals into corresponding code combinations formed of sequentially produced pulses appearing in corresponding time intervals and applied to a single output terminal, said apparatus comprising a storage device connected to each input terminal through an individual connection, said storage device being of the type requiring simultaneous application of a code pulse and a triggering pulse to operate the device, distributor means operating in cycles for applying a triggering pulse to each storage device during each code interval to effect operation of each code device where a code pulse and a trigger pulse appear simultaneously, and means operating synchronously with said distributor means for exploring the storage devices sequentially and transmitting an output pulse to said output terminal when an operated storage device is explored.

No references cited.